Patented July 18, 1933

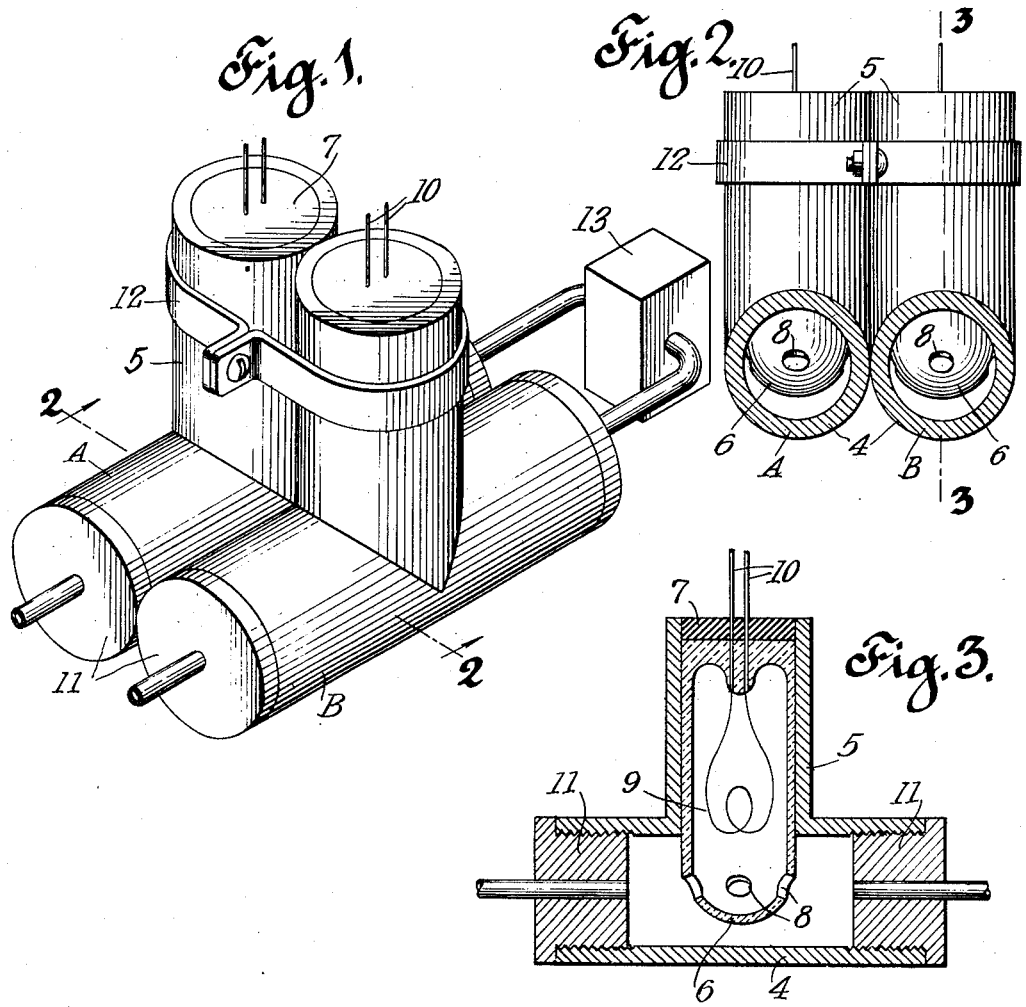

1,918,702

UNITED STATES PATENT OFFICE

WILLIAM O. HEBLER, OF NEWARK, NEW JERSEY, AND WILLIAM F. HAMILTON, OF NEW YORK, N. Y., ASSIGNORS TO CHARLES ENGELHARD, INC., OF NEWARK, NEW JERSEY, A CORPORATION OF NEW JERSEY

CONSTRUCTION OF THERMAL CONDUCTIVITY CELLS

Application filed February 2, 1931. Serial No. 512,976.

This invention relates to gas analysis apparatus of the thermal conductivity type, and more particularly to means for simplifying and reducing the cost of manufacture of such apparatus.

In gas analysis apparatus based on the thermal conductivity principle, it is customary to utilize a Wheatstone bridge, two arms of which are of constant resistance, and the other two arms are variable resistances.

In some instances a bridge may be used in which all four arms comprise variable resistances, two of the arms being surrounded by a reference or standard fluid, and the other two arms surrounded by the fluid being analyzed. Such apparatus provides a simple and convenient means for comparing a differential heat flow through the fluids, and indicating or recording such differential in terms of the composition of the fluid.

However, in actual practice, the apparatus has a number of objectionable characteristics. For example, the apparatus must be painstakingly constructed, as it must be sensitive to minute temperature differentials between the variable arms of the bridge. The electrical resistance of the variable arms must, under fixed conditions, always have a constant value. This means that the crystalline structure of the wire, the tension exerted upon it, the surface of the wire, and its relation to its surroundings, must all remain absolutely unchanged.

At present the requirements are met by providing variable arms made of bare platinum wire, or a platinum spiral embedded in a quartz envelope. However, both of these expedients are objectionable in that they are expensive.

It is an object of this invention to provide a gas analysis apparatus of the thermal conductivity type which meets the requirements as to stability and accuracy, at the same time being constructed of inexpensive parts.

A further object is the provision of a gas analysis apparatus in which standard electric incandescent lamps or the like are used as variable resistances.

A further object is the provision of gas analysis apparatus employing thermal conductivity cells constructed from standard pipe T's and standard electric incandescent lamps.

These and other advantageous objects, which will later appear, are accomplished by the simple and practical construction and arrangement of parts hereinafter described and exhibited in the accompanying drawing, forming part hereof, and in which:

Figure 1 represents a perspective view showing the arrangement of the cells in the gas analysis apparatus.

Figure 2 represents a sectional view through one of the cells taken on line 2—2 of Fig. 1 and Figure 3 represents a sectional view taken on line 3—3 of Fig. 2.

Referring to the drawing, in Figure 1, the gas analysis apparatus is shown to comprise two similar cells A and B, which are placed alongside of each other to equalize the flow of heat.

The mixture of gases to be analyzed is passed through cell A, thence through a scrubbing device 13, which removes certain gases from the mixture, the remaining gases being then passed through cell B. The difference between the resistance changes in the resistance heating elements in cells A and B affects the Wheatstone bridge, to which the cells are connected, to cause a deflection of the needle of a galvanometer, the latter usually being calibrated to indicate the amount of gas removed by the scrubbing device directly in percentage of the original mixture.

In operation, the mixture of gases to be analyzed is passed through both cells A and B, without the scrubbing device. Since the gas is the same in both cells, there should be no deflection of the galvanometer from a zero position, that is, a balanced position. Assume that it is desired to determine the percentage of carbon dioxide in a mixture of carbon dioxide, methane, nitrogen and oxygen. The entire mixture would first be passed through both cells to obtain a balance in the galvanometer, as stated above. Then the scrubber 13 is interposed between the cells to scrub out, that is absorb, the carbon dioxide. Such a scrubber would contain a quantity of carbon dioxide absorbing material such as potassium hydroxide. Now the balance in the galvanometer will be destroyed and the needle will deflect from the zero position depending on the amount of carbon dioxide removed; and it is obvious that the deflection of the needle is due only to the carbon dioxide removed; for the remaining gases in the mixture pass through cell B as before. With the scrubber, we have carbon dioxide, methane, nitrogen and oxygen passing through cell A, and methane, nitrogen and oxygen passing through cell B.

Obviously, the balance position of the galvanometer may be initially obtained by passing air or any other gas through cells A and B. The galvanometer may be calibrated in any well known manner, such as noting the deflections of the galvanometer needle for known percentages of carbon dioxide.

The scrubbing device 13 comprises essentially a casing containing material to absorb certain gases. For example, if a mixture of gases is being tested for carbon dioxide content, the scrubber would contain a quantity of potassium hydroxide which is known to absorb carbon dioxide.

Referring to Figure 2, each cell is shown to include a standard pipe T, having a longitudinal section 4 and a transverse section 5. An electric incandescent lamp 6 is held by cement 7 in the transverse section 5, the lower portion of the bulb of the lamp extending down into the longitudinal section 4.

The lower portion of the bulb is provided with apertures 8 through which gas from the longitudinal section 4 passes into the bulb and around the filament 9, which is now employed as a resistance heating element. The filament 9 is connected by leads 10 to a Wheatstone bridge, and constitutes one arm of the bridge. The ends of the longitudinal section 4 are internally threaded to receive threaded plugs 11, which have central bores connecting external pipes with the chamber formed by the longitudinal section 4 and the plugs.

Both cells A and B are of identically the same structure, and are held as closely together as practicable by a clamp 12 surrounding the transverse sections 5.

It will be noted that in the above described structure, the usual platinum resistance elements have been replaced by filaments of electric incandescent lamps. It has been found that, by proper selection, those bulbs, when used as thermal conductivity cell resistances, are satisfactory. The bulbs may be opened in such a way as to allow the gases or fluids being analyzed to come into direct contact with the filament, or resistance element; or they may be used without being opened, so that the filament remains in a vacuum, thus affording a permanent protection to the filament.

Because of the higher sensitivity, it has been found desirable to open the bulbs; but satisfactory results are also obtained with closed bulbs. The bulbs may also be gas filled to increase the sensitivity.

The material from which the filament is constructed and method in which it is supported are important features to be considered in selecting the electric light bulb for use as a resistance heating element in a thermal conductivity cell.

Filaments composed of tungsten or tantalum of their alloys, have been found desirable; although filaments of platinum, nickel, and similar metals, may be used.

In this connection, any metal may be used; but if the filament is to be exposed to the gas, it is feasible to use only a material which will not be subjected to corrosion by the gas. If, however, the filament is not to be exposed to the gas, it is desirable to use a filament having as high a temperature coefficient as practicable.

As shown in Figure 2, the portion of the bulb containing the filament is embedded in the cement. The holes in the bulb allow the gas to come into contact with the filament and when so mounted, the filament is not affected by the velocity of the gas stream flowing through the cell.

While electric incandescent lamps have been specifically mentioned above, it is obvious that they may be effectively replaced by radio tubes and similar expedients.

The essential reason for employing the electric incandescent lamps or radio tubes is that such articles are standard articles of commerce and available at a cost considerably below the cost of manufacturing platinum resistance heating elements. Also, the lamps and tubes are manufactured with an accuracy commensurate with that required in gas analysis apparatus.

The filaments of incandescent lamps are properly centered with respect to the bulbs, and because of this feature it is desirable to use the filament and bulb together as shown in the drawing, the bulb being sealed in the T by a cement having substantially the same coefficient of expansion as glass. However, it is not necessary to use the bulb, as the filament with its standard mounting may be used alone providing it is properly mounted in the analysis cell.

From the above description, it will be seen that there has been provided a stable and efficient gas analysis apparatus, which may be manufactured at a materially lower cost than has heretofore been possible.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described our invention, what we claim as new and desire to secure by Letters Patent, is:

1. In a gas analysis apparatus of the thermal conductivity type, a pair of pipe T's each having a longitudinal section and a transverse section, electric incandescent lamps mounted in the transverse sections of said T's, the filament of the lamps serving as resistance heating elements, means for hold the T's closely together, and means for passing gases from one T to the other.

2. In a gas analysis apparatus of the thermal conductivity type, a pair of substantially T-shaped tubular members, each having a longitudinal section and a transverse section, resistance heating elements mounted in the transverse sections, means for holding the members close together, and means for passing gases from one member to the other.

3. In a gas analysis apparatus of the thermal conductivity type, a pair of substantially T-shaped hollow members, each having a longitudinal section and a transverse section, resistance heating elements mounted in the transverse sections, means for facilitating the transfer of heat from one member to the other, and means for passing gases from one member to the other.

WILLIAM O. HEBLER.
WILLIAM F. HAMILTON.